US006749502B2

(12) United States Patent
Baerlocher

(10) Patent No.: US 6,749,502 B2
(45) Date of Patent: Jun. 15, 2004

(54) GAMING DEVICE HAVING A MULTI-CHARACTERISTIC MATCHING GAME

(75) Inventor: Anthony J. Baerlocher, Reno, NV (US)

(73) Assignee: IGT, Reno, NV (US)

( * ) Notice: Subject to any disclaimer, the term of this patent is extended or adjusted under 35 U.S.C. 154(b) by 630 days.

(21) Appl. No.: 09/813,698

(22) Filed: Mar. 21, 2001

(65) Prior Publication Data

US 2002/0137559 A1 Sep. 26, 2002

(51) Int. Cl.$^{7}$ .................................... A63F 13/00

(52) U.S. Cl. .................................... 463/16; 463/17

(58) Field of Search .................................... 463/16–20, 25, 463/29; 273/138.1, 139

(56) References Cited

U.S. PATENT DOCUMENTS 4,448,419 A 5/1984 Telnaes
4,508,353 A 4/1985 Meyer et al.
4,624,459 A 11/1986 Kaufman
4,695,053 A 9/1987 Vazquez, Jr. et al.
4,732,386 A 3/1988 Rayffel
4,775,155 A 10/1988 Lees
5,072,946 A 12/1991 Miller
5,205,555 A 4/1993 Humano
5,324,041 A 6/1994 Boylan et al.
5,449,173 A 9/1995 Thomas et al.
5,536,016 A 7/1996 Thompson
5,560,603 A 10/1996 Seelig et al.
5,611,535 A 3/1997 Tiberio
5,722,891 A 3/1998 Inoue
5,769,716 A 6/1998 Saffari et al.
5,772,509 A 6/1998 Weiss
5,788,573 A 8/1998 Baerlocher et al.
5,823,874 A 10/1998 Adams
5,848,932 A 12/1998 Adams
5,851,148 A 12/1998 Brune et al.
5,882,261 A 3/1999 Adams
5,911,418 A 6/1999 Adams
5,919,091 A 7/1999 Bell et al.
5,935,002 A 8/1999 Falciglia
5,944,314 A 8/1999 Stavinsky
5,947,820 A 9/1999 Morro et al.
5,951,397 A 9/1999 Dickinson
5,988,643 A 11/1999 Awada
6,004,207 A 12/1999 Wilson, Jr. et al.
6,015,346 A 1/2000 Bennett
6,059,658 A 5/2000 Mangano et al.
6,089,976 A 7/2000 Schneider et al.
6,089,977 A 7/2000 Bennett
6,102,798 A 8/2000 Bennett
6,105,962 A 8/2000 Malavazos et al.

(List continued on next page.)

FOREIGN PATENT DOCUMENTS

EP 0945837 A2 9/1999
WO WO9732285 9/1997
WO WO 00/12186 3/2000

OTHER PUBLICATIONS

Uno Original Instructions published by Mattel, Inc. in 1998.
Uno Game Illustration written by Marshall Fey, published in 1983,1989,1991,1994 and 1997.

*Primary Examiner*—John M. Hotaling, II
(74) *Attorney, Agent, or Firm*—Bell, Boyd & Lloyd LLC

(57) ABSTRACT

The present invention provides a gaming device having a multi-characteristic matching game. The gaming device includes a controller that provides a base and two or more selections. The base and the selections each have at least two characteristics. The gaming device enables a player to select one selection having at least one characteristic that matches at least one of the characteristics of the base. The gaming device provides an award based on the number of matches or based on the selections matching and/or not matching the base.

72 Claims, 14 Drawing Sheets

U.S. PATENT DOCUMENTS

| | | | |
|---|---|---|---|
| 6,126,542 | A | 10/2000 | Fier |
| 6,129,355 | A | 10/2000 | Hahn et al. |
| 6,142,873 | A | 11/2000 | Weiss et al. |
| 6,159,098 | A | 12/2000 | Slomiany et al. |
| 6,164,652 | A | 12/2000 | Lauretta et al. |
| 6,173,955 | B1 | 1/2001 | Perrie et al. |
| 6,174,235 | B1 | 1/2001 | Walker et al. |
| 6,224,483 | B1 | 5/2001 | Mayeroff |
| 6,227,969 | B1 | 5/2001 | Yoseloff |
| 6,227,971 | B1 | 5/2001 | Weiss |
| 6,231,442 | B1 | 5/2001 | Mayeroff |
| 6,234,897 | B1 | 5/2001 | Frohm et al. |
| 6,261,177 | B1 | 7/2001 | Bennett |
| 6,299,165 | B1 | 10/2001 | Nagano |
| 6,305,686 | B1 | 10/2001 | Perrie et al. |
| 6,309,300 | B1 | 10/2001 | Glavich |
| 6,312,334 | B1 | 11/2001 | Yoseloff |
| 6,315,663 | B1 | 11/2001 | Sakamoto |
| 6,336,860 | B1 | 1/2002 | Webb |
| 6,346,043 | B1 | 2/2002 | Colin et al. |
| 6,347,996 | B1 | 2/2002 | Gilmore et al. |
| 2002/0025847 | A1 | 2/2002 | Thomas et al. |

| PAY TABLE | |
|---|---|
| MATCHES | AWARD |
| 36 | 10,000 |
| 35 | 5,000 |
| 30-34 | 1,000 |
| 25-29 | 500 |
| 20-24 | 250 |
| 15-19 | 100 |
| 10-14 | 50 |
| 5-9 | 10 |
| 0-4 | 0 |

122

GAMING DEVICE HAVING A MULTI-CHARACTERISTIC MATCHING GAME

CROSS REFERENCE TO RELATED APPLICATIONS

This application is related to the following commonly-owned co-pending patent applications: "ELECTRONIC GAMING METHOD AND APPARATUS USING SIMULATED NUMBER CARD DECK," Ser. No. 09/539,277; "IMAGE MATCHING GAME METHOD," Ser. No. 09/395,034; "GAMING DEVICE WITH BONUS SCHEME PROVIDING INCREASED REWARD FOR SELECTING RELATED SYMBOLS," Ser. No. 09/605,023; "GAMING DEVICE HAVING A MULTI-ROUND MULTI-CHARACTERISTIC MATCHING GAME," Ser. No. 10/243,706; and "GAMING DEVICE HAVING A MULTI-CHARACTERISTIC MATCHING GAME INCLUDING SELECTION INDICATORS," Ser. No. 10/243,192;.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

DESCRIPTION

The present invention relates in general to a gaming device, and more particularly to a gaming device having a multi-characteristic matching game.

BACKGROUND OF THE INVENTION

Gaming devices such as slot machines, video poker machines, blackjack machines and keno machines are well-known. Slot and other machines having primary and secondary or bonus games or schemes are also well known. Such gaming devices have schemes in which a player has one or more opportunities to place wagers and interact with the gaming device. Since players continue to seek more entertainment and enjoyment from different types of gaming devices, it is desirable to provide players with gaming devices with new game schemes where the players have an opportunity to receive winning payouts and are entertained at the same time.

SUMMARY OF THE INVENTION

The present invention provides a gaming device having a multi-characteristic matching game scheme. The multi-characteristic matching game scheme of the present invention can be employed as a primary or secondary or bonus game in a gaming device. The gaming device provides a base and a plurality of selections. The base and each of the selections include a plurality of characteristics. To play the game, the player selects at least one selection that has at least one characteristic that matches (i.e., that is the same as, that is equal to or that is equivalent to) one of the characteristics of the base. The game continues as long as the player continues to match characteristics between one of the selections and the base. If the player is unable to make a match, the game terminates or alternatively replaces the selection with new selections. The gaming device provides the player an award based on the number of matches and/or values associated with the matches.

Alternative embodiments of the present invention include providing multiple bases, providing awards associated with different numbers of matches or different ranges of numbers of matches, providing award values for each match, masking selections and having a varying number of characteristics, selections and bases.

In an alternative embodiment of the present invention, one or more of the selections could have multi-part characteristics and/or could have functional elements. Multi-part characteristics could match more than one or multiple different characteristics similar to the function of a wild card. Functional elements of selections could perform actions such as, but not limited to, changing one or more characteristics of the base, changing one or more of the selections or characteristics of the selections, adding another base, eliminating a selection, etc.

In another embodiment of the present invention, a selection could reveal associated selections such as selections that the first selection was blocking or overlaying. Such associated selections may have none, some or all of such selection's characteristics revealed to the player while it was blocked. This would enable the player to strategically select the selection that would unblock or make available a desired selection.

In yet another embodiment of the present invention, the selection could be masked and revealed as they are selected. If the chosen selection has a characteristic matching one of the characteristics of the base, it is matched to (or replaces) the base, otherwise the revealed selection is a miss. In this embodiment, a defined number of misses would end the game.

It is therefore an advantage of the present invention to provide a gaming device having a multi-characteristic matching primary game scheme.

It is a further advantage of the present invention to provide a gaming device having a multi-characteristic matching secondary game scheme.

Other objects, features and advantages of the invention will be apparent from the following detailed disclosure, taken in conjunction with the accompanying sheets of drawings, wherein like numerals refer to like parts, elements, components, steps and processes.

DETAILED DESCRIPTION OF THE INVENTION

Gaming Device and Electronics

Figure 1A:
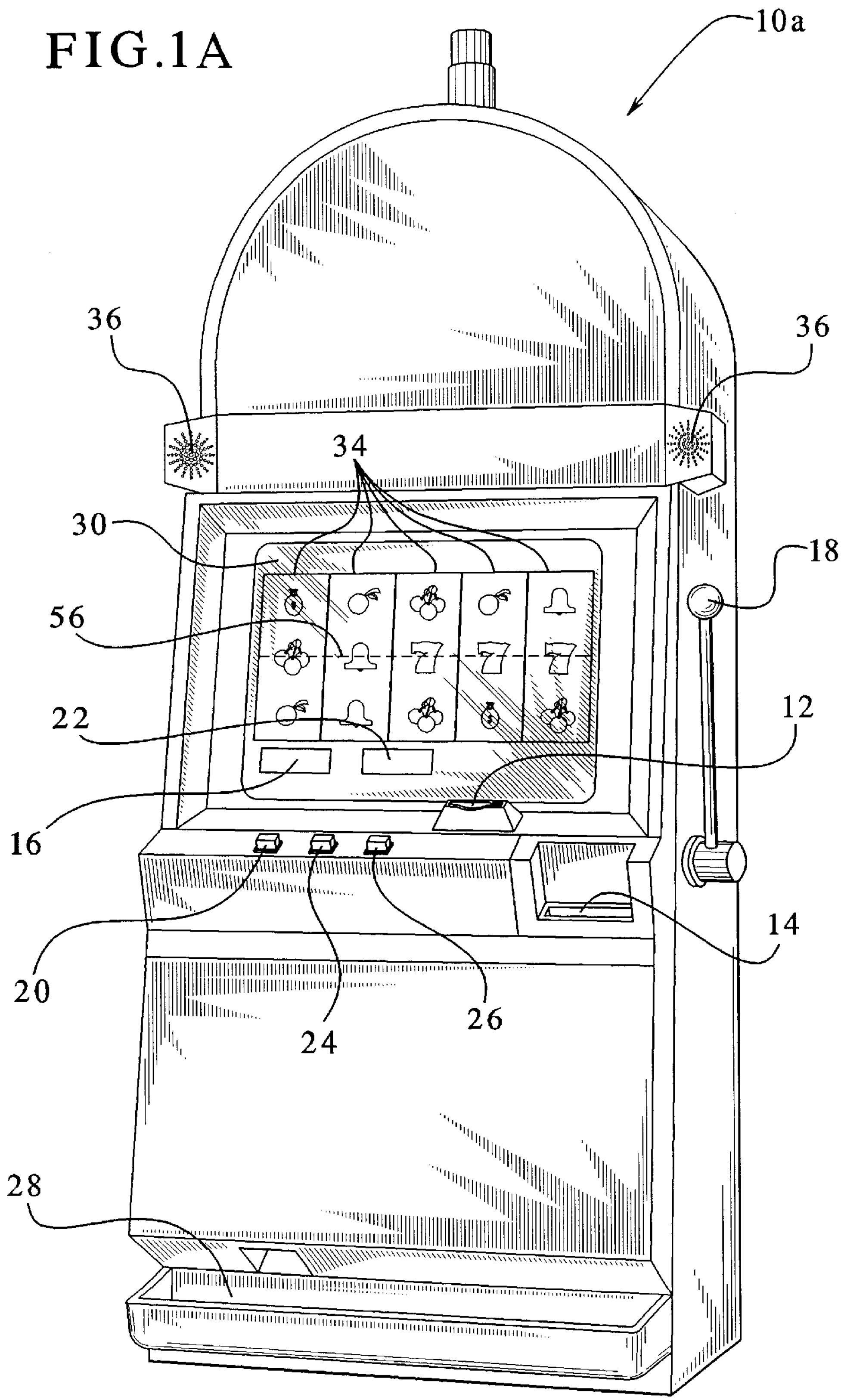
FIGS. 1A and 1B are perspective views of alternative embodiments of the gaming device of the present invention.
Figure 1B:
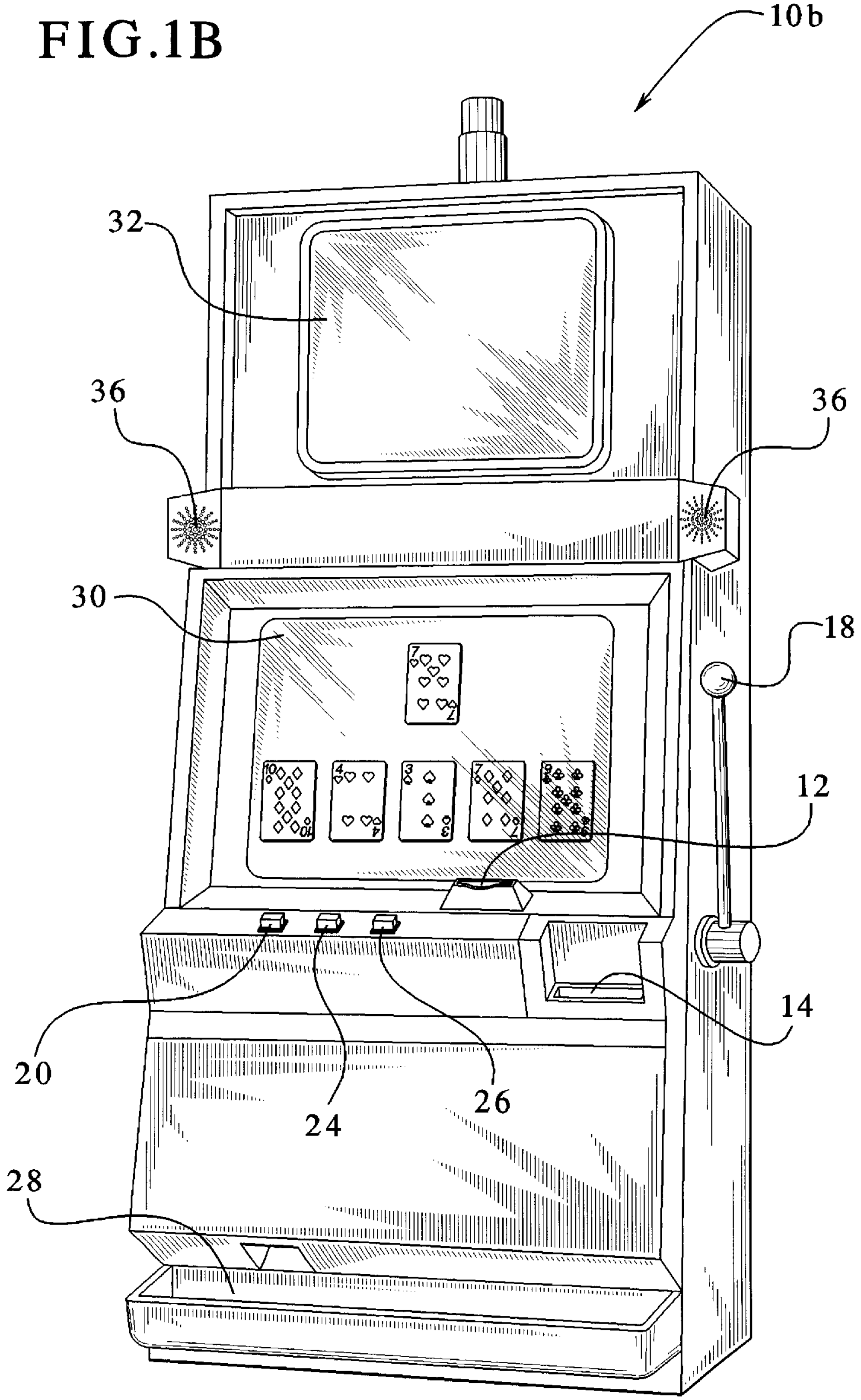

Referring now to the drawings, two embodiments of the gaming device of the present invention are illustrated in FIGS. 1A and 1B as gaming device 10*a* and gaming device 10*b*, respectively. Gaming device 10*a* and/or gaming device 10*b* are generally referred to herein as gaming device 10. Gaming device 10 preferably has controls, displays and features of a conventional gaming machine. It is constructed so that a player can operate it while standing or sitting, and gaming device 10 is preferably mounted on a console. However, it should be appreciated that gaming device 10 can be constructed as a pub-style table-top game (not shown) which a player can operate preferably while sitting. Furthermore, gaming device 10 can be constructed with varying cabinet and display designs, as illustrated by the designs shown in FIGS. 1A and 1B. Gaming device 10 can also be implemented as a program code stored in a detachable cartridge for operating a hand-held video game device. Additionally, gaming device 10 can be implemented as a program code stored on a disk or other memory device which a player can use in a desktop or laptop personal computer or other computerized platform.

If the present invention is employed as a bonus game, the gaming device 10 can incorporate any primary game such as slot, poker, blackjack or keno, any of their bonus triggering events and any other bonus game in addition to the bonus game of the present invention. The symbols and indicia used on and in gaming device 10 may be in mechanical, electrical or video form.

As illustrated in FIGS. 1A and 1B, gaming device 10 includes a coin slot 12 and bill acceptor 14 where the player inserts money, coins or tokens. The player can place coins in the coin slot 12 or paper money or ticket vouchers in the bill acceptor 14. Other devices could be used for accepting payment such as readers or validators for credit cards or debit cards. When a player inserts money in gaming device 10, a number of credits corresponding to the amount deposited is shown in a credit display 16. After depositing the appropriate amount of money, a player can begin the game by pulling arm 18 or pushing play button 20. Play button 20 can be any play activator used by the player which starts any game or sequence of events in the gaming device 10.

As shown in FIGS. 1A and 1B, gaming device 10 also includes a bet display 22 and a bet one button 24. The player places a bet by pushing the bet one button 24. The player can increase the bet by one credit each time the player pushes the bet one button 24. When the player pushes the bet one button 24, the number of credits shown in the credit display 16 decreases by one, and the number of credits shown in the bet display 22 increases by one.

At any time before or after playing the game, a player may "cash out" and thereby receive a number of coins corresponding to the number of remaining credits by pushing a cash out button 26. When the player "cashes out," the player receives the coins in a coin payout tray 28. The gaming device 10 may employ other payout mechanisms such as credit slips redeemable by a cashier or electronically recordable cards which keep track of the player's credits.

Gaming device 10 also includes one or more display devices. The embodiment shown in FIG. 1A includes a central display device 30, and the alternative embodiment shown in FIG. 1B includes a central display device 30 as well as an upper display device 32. Gaming device 10*a* displays a plurality of reels 34, preferably three to five reels 34 in mechanical or video form. In this game, the present invention is employed in a bonus round at one or more of the display devices. Gaming device 10*b* displays a base card and a plurality of selections on the display device 32. In this game, the present invention is employed as a primary and/or secondary game. However, it should be appreciated that the display devices can display any visual representation or exhibition, including but not limited to movement of physical objects such as mechanical reels, cards, symbols, wheels, dynamic lighting and video images. A display device 32, 34 can be any viewing surface such as glass, a video monitor or screen, a liquid crystal display or any other display mechanism. If the reels, cards or other displayed images are in video form, the display device 32, 34 for the video reels, cards or other displayed images is preferably a video monitor.

The displays include a plurality of indicia such as bells, hearts, fruits, numbers, letters, bars or other images such as playing cards, which preferably correspond to a theme associated with the gaming device 10. Furthermore, the gaming device 10 preferably includes speakers 36 for making sounds or playing music.

Figure 2:
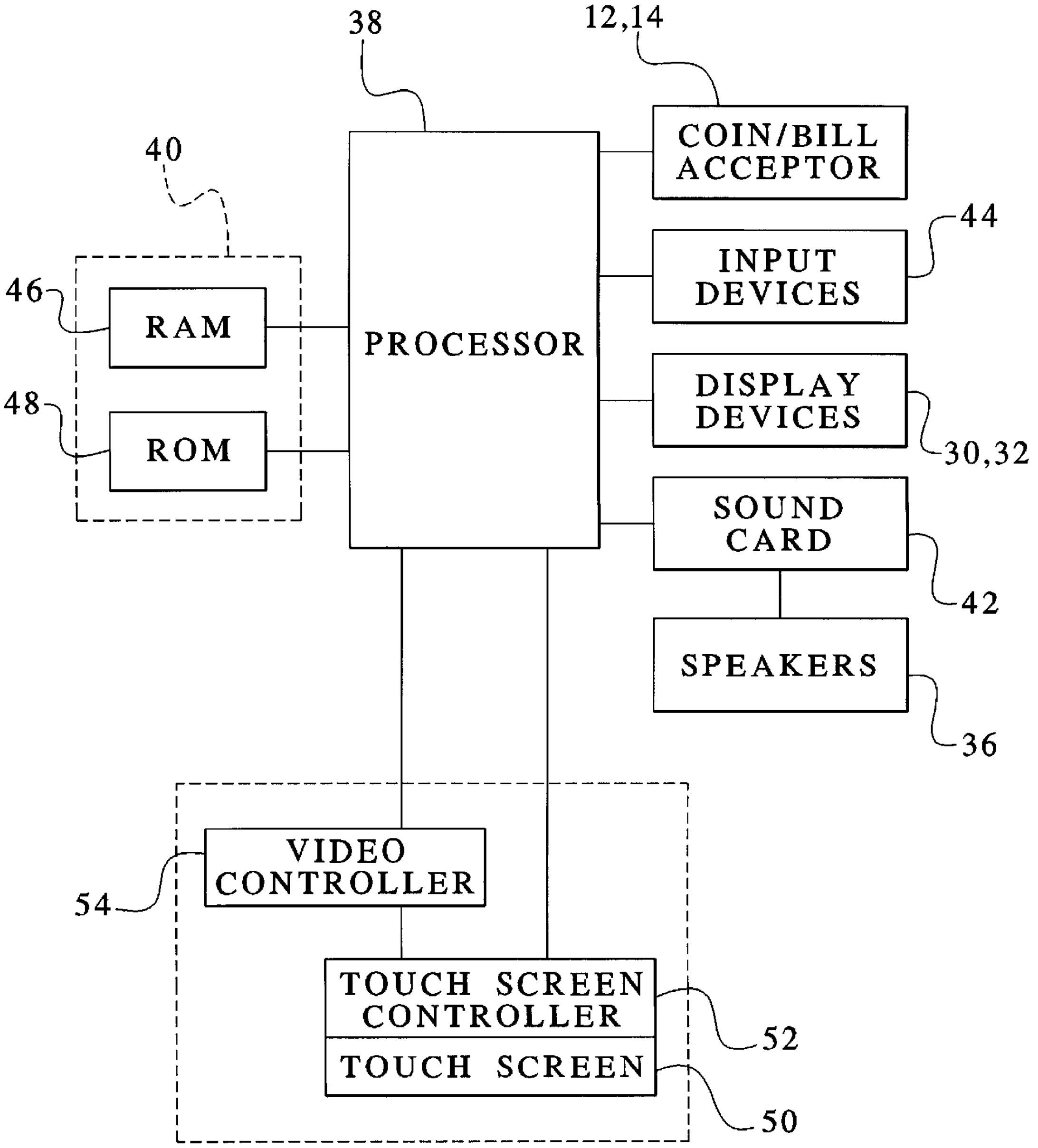
FIG. 2 is a schematic block diagram of the electronic configuration of one embodiment of the gaming device of the present invention.

As illustrated in FIG. 2, the general electronic configuration of gaming device 10 preferably includes: a processor 38; a memory device 40 for storing program code or other data; a central display device 30; an upper display device 32; a sound card 42; a plurality of speakers 36; and one or more input devices 44. The processor 38 is preferably a microprocessor or microcontroller-based platform which is capable of displaying images, symbols and other indicia such as images of people, characters, places, things and faces of cards. The memory device 40 may include random access memory (RAM) 46 for storing event data or other data generated or used during a particular game. The memory device 40 may also include read only memory (ROM) 48 for storing program code which controls the gaming device 10 so that it plays a particular game in accordance with applicable game rules and pay tables.

As illustrated in FIG. 2, the player preferably uses the input devices 44, such as pull arm 18, play button 20, the bet one button 24 and the cash out button 26 to input signals into gaming device 10. In certain instances, it is preferable to use a touch screen 50 and an associated touch screen controller 52 instead of a conventional video monitor display device.

The touch screen 50 and the touch screen controller 52 are connected to a video controller 54 and processor 38. A player can make decisions and input signals into the gaming device 10 by touching touch screen 50 at the appropriate places. As further illustrated in FIG. 2, the processor 38 may be connected to coin slot 12 or bill acceptor 14. The processor 38 may be programmed to require a player to deposit a certain amount of money in order to start the game.

It should be appreciated, that although a processor 38 and memory device 40 are preferable implementations of the present invention, the present invention can also be implemented using one or more application-specific integrated circuits (ASIC's) or other hard-wired devices, or using mechanical devices (collectively referred to herein as a "processor"). Furthermore, although the processor 38 and memory device 40 preferably reside on each gaming device 10 unit, it is possible to provide some or all of their functions at a central location such as a network server for communicating with a playing station over a local area network (LAN), wide area network (WAN), Internet connection, microwave link, and the like. The processor 38 and memory device 40 is generally referred to herein as the computer or controller.

With reference to FIGS. 1A, 1B and 2 and where the present invention is employed in a bonus round, to operate the gaming device 10 in one embodiment the player inserts the appropriate amount of money or tokens at coin slot 12 or bill acceptor 14 and then pulls the arm 18 or push the play button 20. If the game is a slot machine, the reels 34 will then begin to spin. Eventually, the reels 34 will come to a stop. As long as the player has credits remaining, the player can spin the reels 34 again. Depending upon where the reels 34 stop, the player may or may not win additional credits.

In addition to winning credits in this manner, preferably gaming device 10 also gives players the opportunity to win credits in a bonus round. This type of gaming device 10 will include a program which automatically begins a bonus round when the player has achieved a qualifying condition in the game. This qualifying condition can be a particular arrangement of indicia on the display device. The gaming device 10 preferably uses a video-based central display device 30 to enable the player to play the bonus round. Preferably, the qualifying condition is a predetermined combination of indicia appearing on a plurality of reels 34. As illustrated in the five reel slot game shown in FIG. 1A, the qualifying condition could be the number seven appearing on three adjacent reels 34 along a payline 56. It should be appreciated that the present invention can include one or more paylines displayed in a horizontal and/or diagonal fashion.

The present invention can also be employed as a primary game in a gaming machine as shown in FIG. 1B. In this embodiment, a pre-set or predetermined number of matches would be required for a win. For instance, five matches could be required for a minimum win. The number of matches greater than the minimum number could increase the amount or value of the win. A number of matches such as 7 matches may also trigger a bonus game.

Gaming Scheme

Referring now to FIGS. 3, 4A, 4B, 4G, 4D, 4E and 5, one embodiment of a multi-characteristic matching game of the present invention is illustrated. The gaming device 10 provides a base and a plurality of selections. The base and each of the selections have two characteristics and can have multi-part characteristics as described below. However, it should be appreciated that the base and selections could have more than two characteristics and can have multi-part characteristics as described below. A player picks, chooses or selects at least one selection that has at least one characteristic that matches at least one of the characteristics of the base. The gaming device 10 counts the matches and provides the player an award such as credits based on the number of matches or a value associated with the matches as further discussed below. The game continues as long as the player continues to specify selections which have at least one characteristic that matches one of the characteristics of the base. The game terminates if the player is unable to make such a selection.

The multi-characteristic matching game of the present invention may be employed as a primary game in a gaming machine or a bonus game associated with a gaming device having a primary game. For purposes of this application, the multi-characteristic match game of the present invention is primarily described as a bonus game. The gaming device 10 employing the present invention in a bonus game initiates the bonus round when the player achieves a qualifying condition as discussed above.

Additionally, the gaming device 10 may include two versions of the multi-characteristic matching game including, both a primary game and a bonus round. The primary game could include one version of the multi-characteristic matching game that is more difficult to win (i.e., difficult to achieve a large number of matches, limiting the chance of winning or advancing to the bonus round). The bonus round could include another version of the multi-characteristic matching game that is easier to win in comparison to the primary game and that could include a much larger award or jackpot. It should also be appreciated that the gaming device 10 could also provide a plurality of multi-characteristic matching games sequentially played to obtain a large jackpot.

Figure 3:
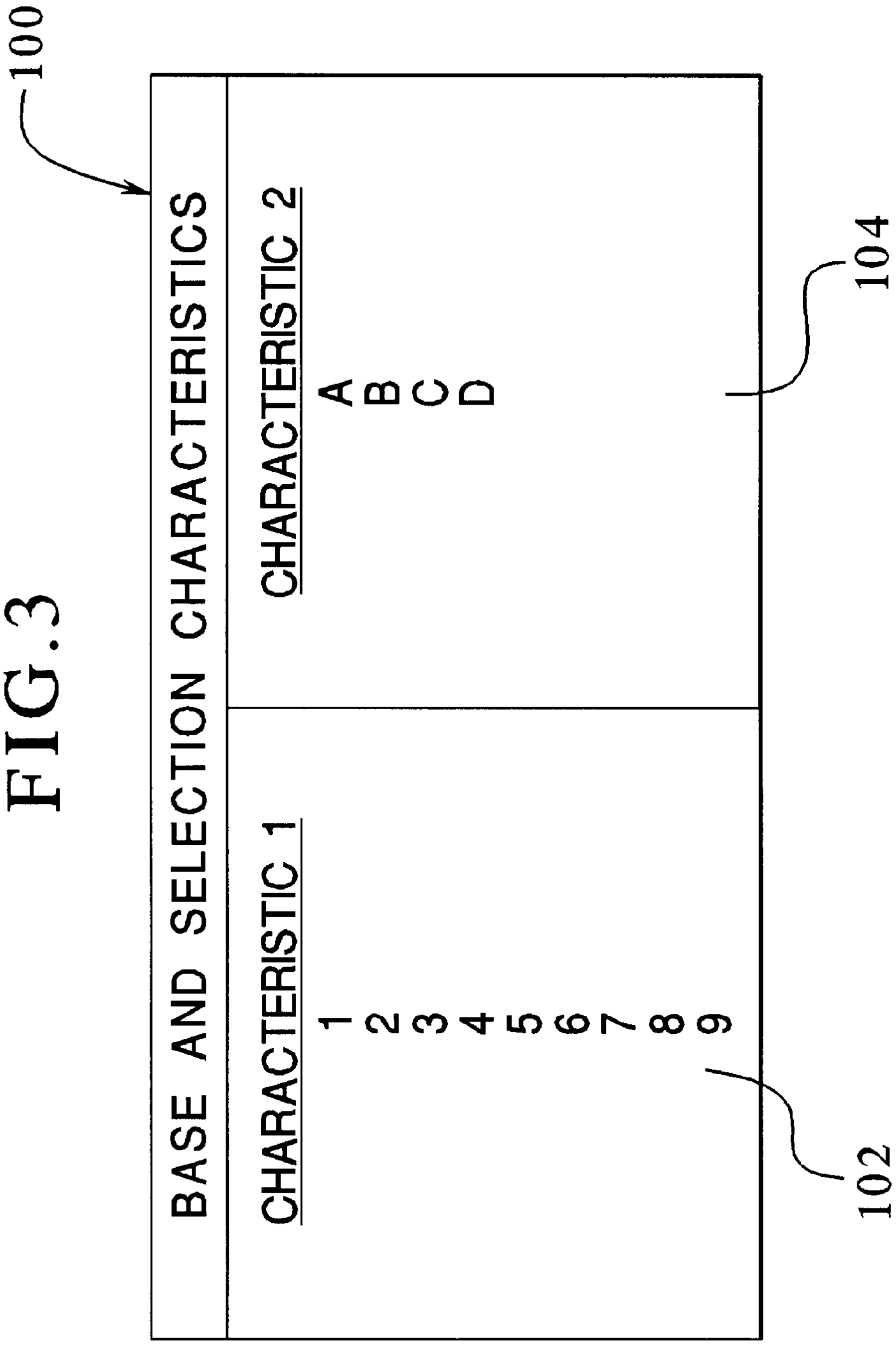
FIG. 3 is a table illustrating two characteristics used in one embodiment of the multi-characteristic matching game of the present invention.

Preferably, the multi-characteristic matching game includes a plurality of characteristics associated with the base and each selection. Table 100 in FIG. 3 illustrates one embodiment of the matching game having two sets of characteristics assigned to the base and the selections. It should be appreciated that while only two sets of characteristics are illustrated, two or more sets are contemplated.

Table 100 illustrates a set of numbers consisting of numbers 1 through 9 (referred to as Characteristic 1 and generally designated 102) and a set of letters consisting of letters A through D (referred to as Characteristic 2 and generally designated 104). In this embodiment, the gaming device 10 provides 36 possible combinations of Characteristics 1 and 2. It should be appreciated that any suitable number of each characteristic may be employed in accordance with the present invention.

The gaming device 10 preferably assigns or associates one characteristic from each of the characteristic sets to the base and to each selection. It should be appreciated that more than one characteristic from each set could be assigned or associated with the base and the selections. In one embodiment of the gaming device 10, the controller randomly selects or assigns the characteristics to the base and the selections. In another embodiment of the present invention, the gaming device 10 could include an algorithm that assigns a weight factor to each characteristic, so that specific values of one characteristic set having higher weight factors have a greater chance of being selected by the gaming device. This may result in such specific characteristics having a greater chance of being associated with specific values of the other set or that such specific characteristics have a greater chance of being assigned to the base or selections. This weight factor may be consistent throughout the entire matching game or may change after each match. In a preferred embodiment of the present invention discussed herein, prior to beginning ordinary play of the game, the controller assigns or associates the characteristics to the base and the selections such that the base and the selections are all different (i.e., do not have all of the same characteristics.) In the embodiment utilizing 36 combinations, there would be one base and 35 selections which are all different.

While numbers and letters are illustrated as characteristics, any type of characteristics could be employed in connection with the present invention such as characters, pictures and images. The sets of characteristics may have some predetermined or logical relationship. For example, the sets could include values and suits associated with a deck of cards, months of the year and signs of the Zodiac, television programs and characters, sport teams and positions, cities and states, etc. Alternatively, the sets may not have any logical relationship. For example, one set could include colors and the other set could include numbers.

Referring now to one embodiment of the multi-characteristic matching game illustrated in FIGS. 4A through 4E, the gaming device provides a screen or display 106 (which is preferably a touch screen provided by display devices 30 or 32). The display enables the player to pick, choose or select at least one selection from a plurality of selections having at least one characteristic that matches at least one characteristic of the base.

In this illustrated embodiment, the display displays a base 108, a match display 110 and a plurality of selections 112, 114, 116, 118 and 120. It should be appreciated that while five selections are illustrated, any suitable number of selections are contemplated. Appropriate messages such as "SELECTIONS," "MAKE A SELECTION" or "SELECT A MATCH" are preferably provided to the player visually, or through suitable audio or audiovisual displays in conjunction with the plurality of selections.

The match display 110 tracks and displays the number of matches. In the illustrated embodiment, the award display is labeled "METER," tracking the total number of matches made during the matching game. Each time the player makes a match, the match display 110 increases by one increment. The meter may start at zero or one as desired by the implementor of the game. Preferably, the number of matches has some corresponding award value as discussed subsequently, although other award methods are contemplated also as further discussed below.

In the illustrated embodiment, the controller selects a base and five selections from the thirty-six possible selections. In an alternative embodiment, the gaming device could: (a) select at least one value from the plurality of values of Characteristic 1 (here the number 8), assign it to the base and display it as C1; (b) select two or more values from the plurality of values of Characteristic 1 (here the numbers 8, 1, 5, 7 and 3), assign one to each of the five selections 112, 114, 116, 118 and 120, respectively, and display them as C1; (c) select at least one value from the plurality of values of Characteristic 2 (here the letter D), assign it to the base and display it as C2; (d) select two or more values from the plurality of values of Characteristic 2 (here the letters A, B, C, A and D), assign one to each of the five selections 112, 114, 116, 118 and 120, respectively, and display them as C2 as indicated.

In an alternate embodiment, the gaming device could select a base and selection that already have all characteristics predetermined.

It should be appreciated that one, more or none of the selections may initially have a characteristic that matches the base characteristic. When the invention is employed as a primary game, there may be no matches.

Figure 4A:
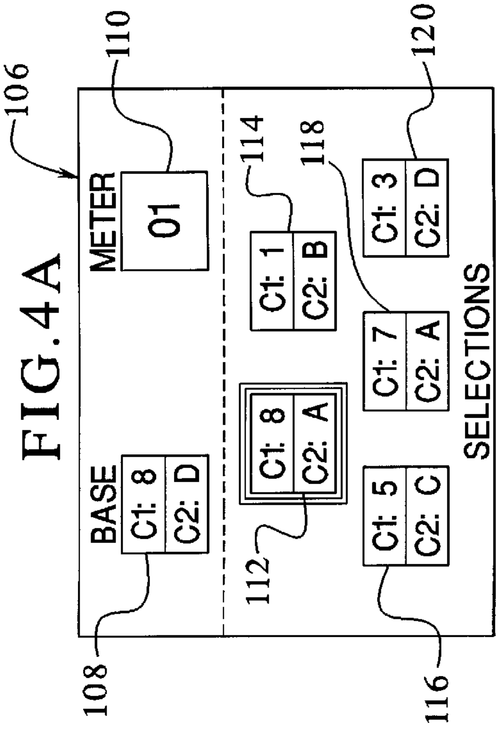
FIGS. 4A, 4B, 4C, 4D and 4E are front elevational views of a display of one embodiment of the multi-characteristic matching game of the present invention illustrating selections having at least one characteristic that matches a characteristic of a base from a plurality of selections.

During the first play of the matching game illustrated in FIG. 4A, the base displays C1=8 and C2=D. The player looks for a selection having a characteristic matching either characteristic of the base. In this illustrated embodiment, selection 112 has a characteristic C1=8 that matches C1 of the base. The player selects selection 112.

The gaming device preferably highlights selection 112 or otherwise indicates the selection. The gaming device also records this match in the match display 110, incrementing the number of matches by one, so that the match display reads "01." The matching game continues as illustrated in FIGS. 4B through 4E.

Figure 4B:
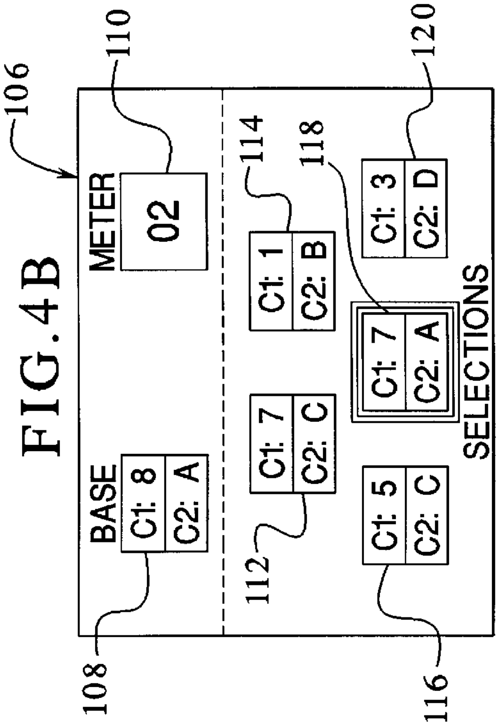

The gaming device provides a new base as illustrated in FIG. 4B. In the preferred embodiment, the gaming device replaces the base of the previous play with selection 112. Specifically, the gaming device replaces C1 and C2 of the base 108 with C1 and C2 of selection 112 from FIG. 4A. The gaming device displays base 108 having C1=8 and C2=A. It should be appreciated, however, that the gaming device could alternatively provide a new base in a different manner such as selecting a new C1 and C2 from Characteristics 1 and 2 similar to that described previously. The gaming device also generates a new selection 112 (illustrated in FIG. 4B) from the remaining combinations of 36 original combinations. In this example, the gaming device provides a selection 112 displaying C1=7 and C2=C as illustrated in FIG. 4B.

The player again picks one of the selections having a characteristic that matches one of the characteristics of the new base 108. The player picks selection 118 having C2=A that matches C2=A of the base as illustrated. Again, the gaming device highlights the selection and records the match in the match display 110, incrementing the METER by 1 so that it displays "02."

Figure 4C:
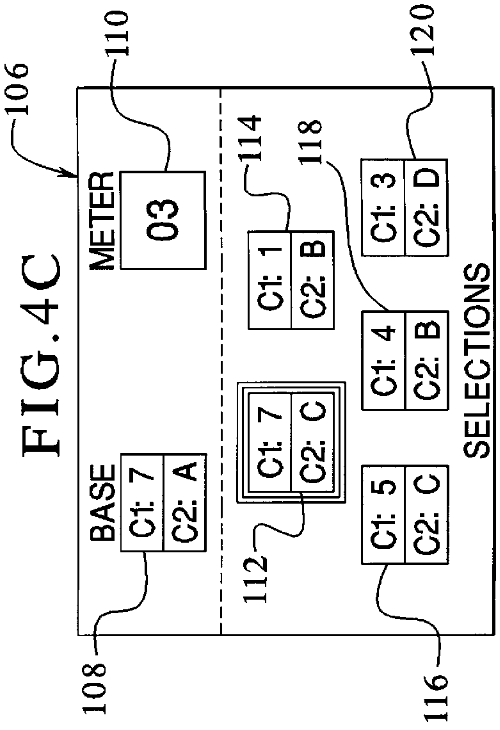
Figure 4D:
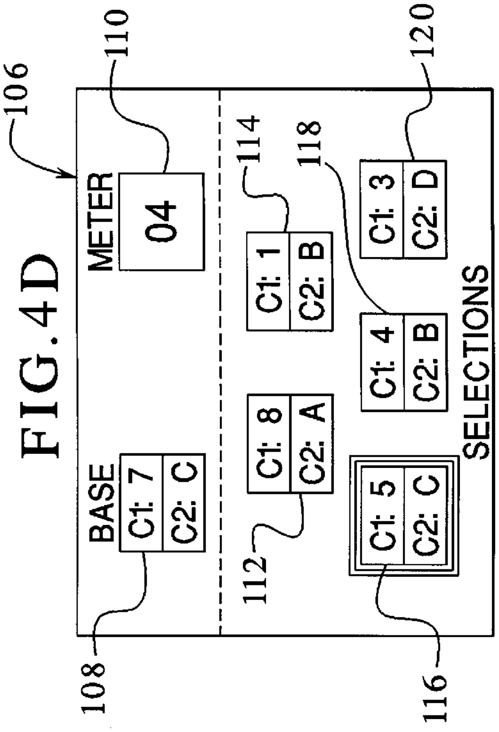
Figures 4E, 5:
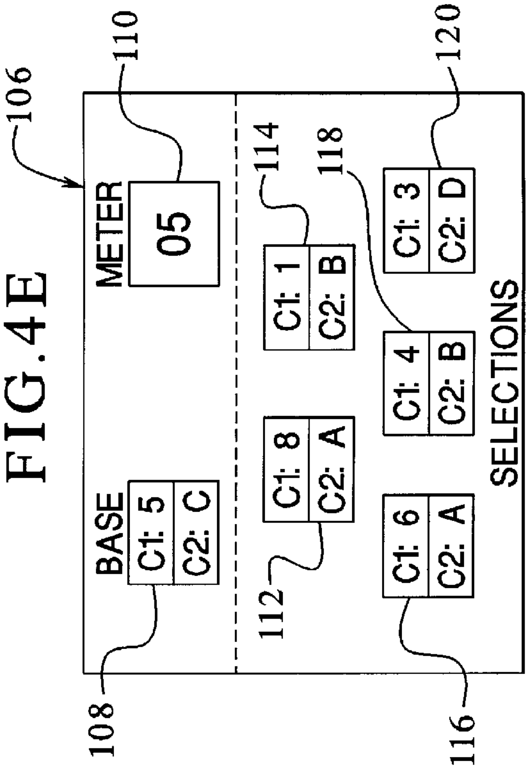
FIG. 5 is a pay table used in one embodiment of the matching game of the present invention illustrating the awards, credits or bonus values associated with the number of matches.

The matching game continues, alternatively providing new bases and selections as illustrated in FIGS. 4C through 4E until the matching game ends or is terminated. In this embodiment, the matching game terminates when the player is unable to select a characteristic that matches one of the characteristics of the base as illustrated in FIG. 4E. That is, there are no more possible matches.

The gaming device terminates the matching game and determines whether the game should provide the player with an award. Alternatively, the matching game could continue until the player has selected a predetermined number of matches. The gaming device could continue the matching game until the players has matched all combinations of C1 and C2, here 36 matches. Furthermore, the gaming device may provide accept and reject buttons enabling the player to terminate the matching game after each match. In this embodiment, the accept or reject decision might occur before the replacement selection is revealed. If the offer is rejected, and no characteristics of the selections match those of the base, the player will receive an award smaller than the previous offer.

Preferably, if the present invention is implemented as a bonus round, the gaming device provides the player with an award after terminating the matching game.

In one embodiment, the award is based on the number of matches as provided by the match display. Preferably, the greater the number of matches, the higher the award value as illustrated by pay table 122 in FIG. 5. It should be appreciated that the gaming device may provide different awards for a range of matches (i.e., 5 to 9 matches may have an associated award of 10 credits while 10 to 14 matches may have an associated award of 50 credits). Each individual match may have an associated award (i.e., one match is worth one credit, two matches is worth two credits, etc.). Additionally, the gaming device 10 may provide awards based on a combination of ranges and individual matches as illustrated in the pay table. In the embodiment illustrated in FIGS. 4A through 4E, the player has 5 matches and is awarded 10 credits in accordance with the pay table. Had the player made 10 matches, the gaming device would award the player 50 credits. It should be appreciated that the pay table 122 is provided as an example only.

While awarding credits based on the number of matches is preferred, other methods are contemplated for rewarding the player for playing the matching game. The award could be based on the value of the selections. For example, selecting a selection having C1=7 may result in the player receiving an award of 7, while a selection having C=3 may result in the player receiving an award of 3. These awards would be added and displayed to the player in a value display as described below.

Alternatively, each characteristic could have a predetermined value, where each selection would result in the player receiving a predetermined award (10 credits for example). The gaming device may assign the characteristics different predetermined values, wherein matching one set of characteristics results in one predetermined amount (10 credits for example) while matching another characteristic may result in another predetermined amount (5 credits for example). The gaming device 10 could also randomly assign an award to the player or according to some algorithm. The number of matches may lead to a certain level of play at a next level such as a number of picks given for prizes.

In another embodiment, the gaming device 10 may award the player based on the last match. That is, the player may not receive an award until the last selection, at which time the gaming device 10 awards the value of the last selection to the player. For example, if the last remaining unmatched base has a characteristic of 7, the gaming device 10 could provide that player with an award of 7. It should be appreciated that this award may include a predetermined amount associated with the last selection or some other value associated with the last selection.

The gaming device 10 could also provide credits based on the number of matches and some value modified or altered by a modifying 5 factor. For example, the matching game may include a multiplier such as 2×, 3×, 8×, etc., wherein the gaming device 10 provides an award equal to two, three or eight times the number of matches or predetermined value. The modifying factor could include factors other than a multiplier. For example, embodiments of the matching game are contemplated wherein the game tracks both the value for each match and the number of matches. The award could be based on some combination of these two, whether multiplied together, added together or subtracted one from the other (i.e., value of picked selection plus number of matches or times number of matches).

The gaming device 10 could provide an award wherein the value or number of selections not matched are used to modify the award. For example, the gaming device 10 could track those selections that are not matched by the player during the game. The gaming device 10 could track the number of the selections, the value of the selections, a predetermined value of the selections, etc. This number could then be used to modify the award. In this embodiment, the number would be used to reduce the award.

The gaming device 10 could also award the player based on some other factor. For example, the gaming device 10 might associate credits with specific selections. The gaming device 10 would award the player an extra or bonus value if certain selections are matched. Alternatively, the gaming device 10 may provide an extra or bonus value if the player is able to match all the selections or all possible combinations of the characteristics.

A further alternative embodiment of the multi-characteristic matching game of the present invention is illustrated in FIGS. 6A, 6B, 6C, 6D, 6E, 6F and 6G. The gaming device 10 provides a display 206 having a base 208, a match display 210 and a plurality of selections 212, 214, 216, 218, 220 and 221. It should be appreciated that six selections increases the player's chance of making a match assuming the number in the sets of characteristics remains the same.

Figure 6A:
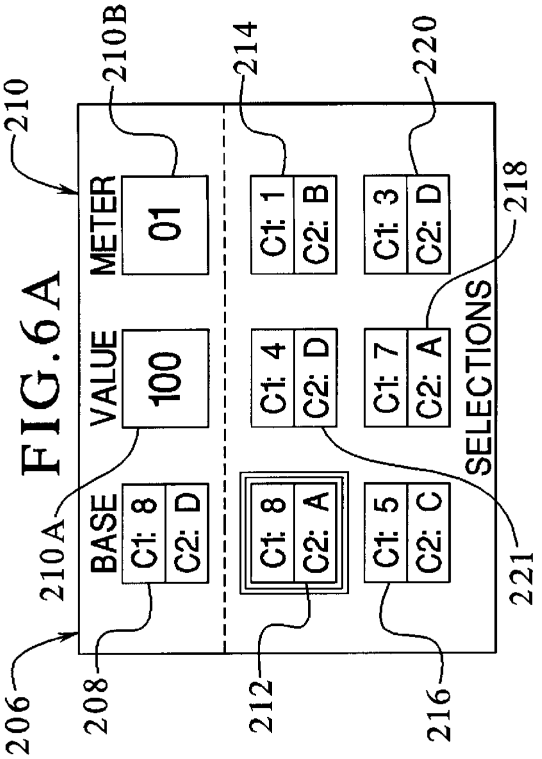
FIGS. 6A, 6B, 6C, 6D, 6E, 6F and 6G are front elevational views of a display of an alternative embodiment of the multi-characteristic matching game of the present invention illustrating a base having two characteristics and choosing selections having at least one characteristic that matches a characteristic of the base from the plurality of selections.
Figure 6B:
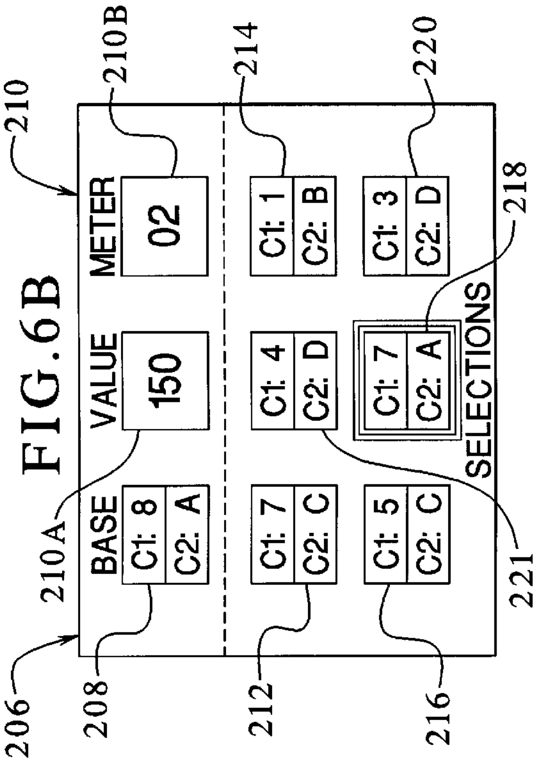
Figure 6C:
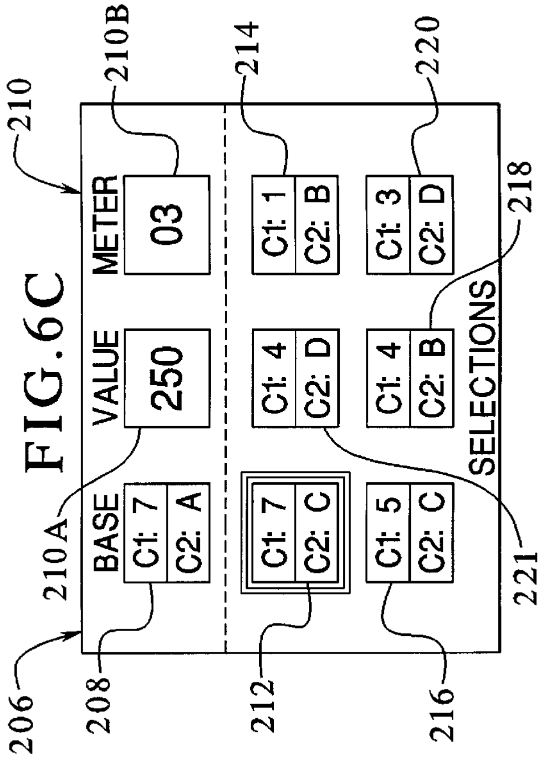
Figure 6D:
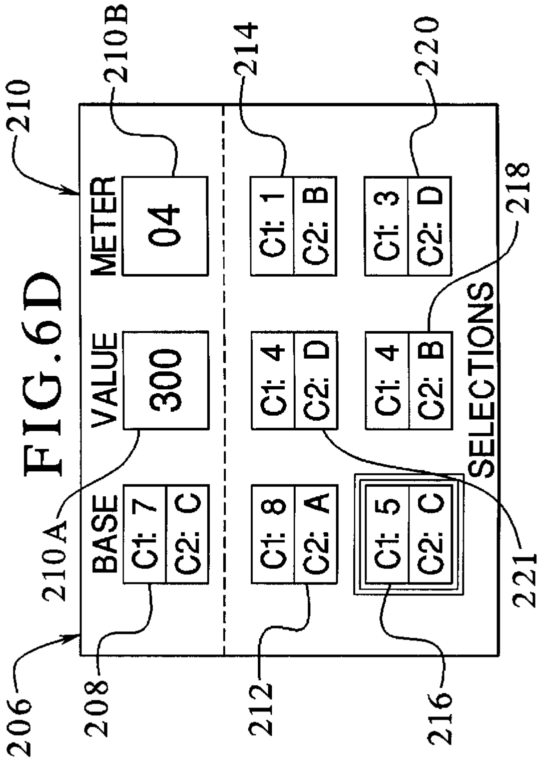
Figure 6E:
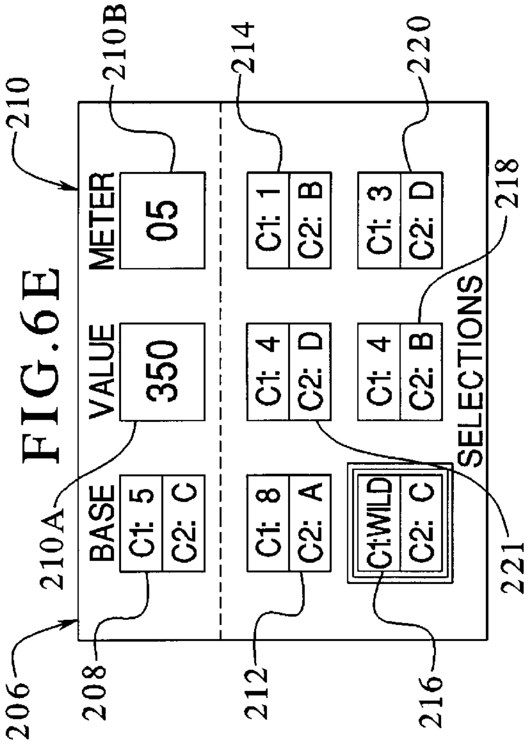
Figure 6F:
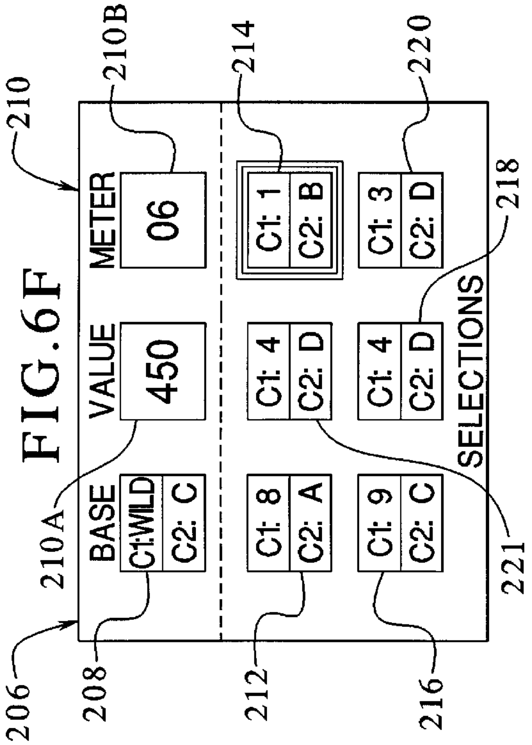
Figure 6G:
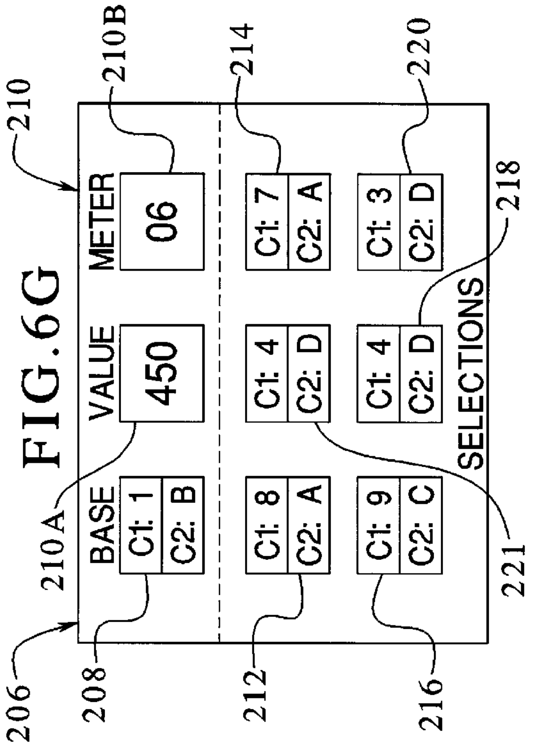

In this embodiment, the award display includes a value display 210A labeled "VALUE" and a match display 210B labeled "METER." The value display 210A tracks the awards for the matches made during the matching game. Preferably, the matches have some predetermined award value that is consistent throughout the matching game. For example, each match may be worth 100 credits. It should also be appreciated that different matches may have different awards. For example, matching the characteristics C1 may be worth 100 points as illustrated in FIGS. 6A, 6C and 6F. However, matching characteristics C2 may only be worth 50 points, as illustrated in FIGS. 6B, 6D and 6E. The match display 210B tracks the matches as described above.

The gaming device 10 assigns characteristics C1 and C2 to the base and the selections as described previously. During the first play of this example bonus game illustrated in FIG. 6A, the base displays C1=8 and C2=D. The player selects selection 212 having a characteristic C1=8 that matches the C1 of the base.

The gaming device 10 records this match or selection in the award display 210, recording a predetermined award of 100 in value display 210A and incrementing the number of matches by one, so that match display 210B is "01." The multi-characteristic matching game continues as illustrated in FIGS. 6B through 6G.

The gaming device 10 provides a new base and generates a new selection 212 as illustrated in FIG. 6B. The player again selects one of the selections having a characteristic that matches one of the characteristics of the new base. The player picks selection 218 having C2=A that matches C2=A of the base as illustrated. The gaming device 10 highlights the selection, and records the award in the award display 210, incrementing the value display 210A by 50 so that it displays 150 and the match display 210B by 1 so that it displays "02."

The matching game continues, alternatively providing new bases and selections as illustrated. In this embodiment, the matching game includes a wild characteristic (labeled "WILD") that may match any other characteristic as illustrated in FIGS. 6E and 6F. It should be appreciated that the wild characteristic could be assigned to C1, C2 or both C1 and C2 of any base or selection. In one embodiment, the player must match a selection before the wild characteristic may be utilized. Alternatively, the wild characteristic may be utilized at any time. In FIG. 6E, the matching game provides selection 216 having C1=WILD and C2=C. In this embodiment, the player must match selection 216 before the wild characteristic may be utilized as illustrated in FIGS. 6E and 6F.

It should be appreciated that the wild characteristics could have a multiplier or other factor associated with it. That is, using the wild characteristic could result in values or matches being increased. For example, the wild characteristic could include a 2× multiplier, so that the award or number of matches is doubled. Alternatively, this multiplier or another suitable modifier could be employed at any time by the multi-characteristics matching game.

Figure 7B:
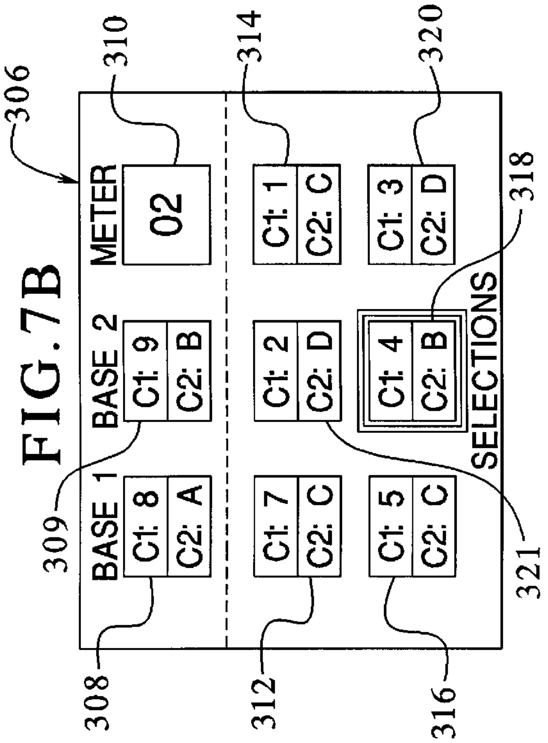
FIGS. 7A, 7B and 7C are front elevational views of a display of another alternative embodiment of the multi-characteristic matching game of the present invention illustrating two bases and choosing selections having at least one characteristic that matches a characteristic of one of the base from the plurality of selections.
Figure 7A:
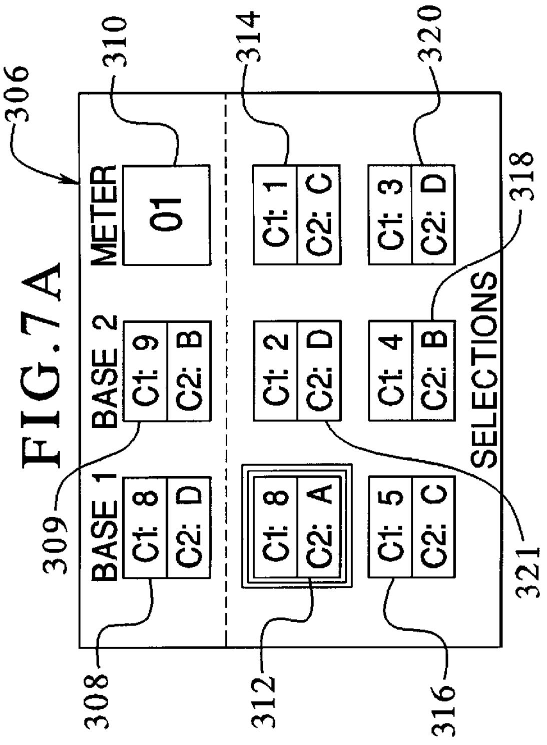
Figure 7C:
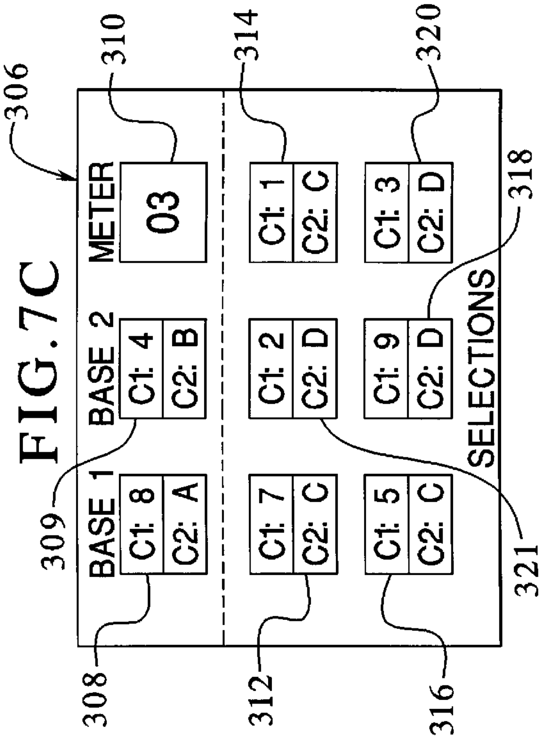

Referring now to the alternative embodiment of the matching game illustrated in FIGS. 7A, 7B and 7C, the gaming device 10 provides a screen or display 306. In this embodiment, the display provides multiple or two bases 308 and 309 that each have two characteristics, the match display 310 and a plurality of selections 312, 314, 316, 318, 320 and 321. It should be appreciated that while two bases and selection are illustrated, any number of bases are contemplated. It should also be appreciated that one of the bases could include one, two or more characteristics.

The gaming device 10 selects one combination of characteristics for each base. In this example, base 308 includes the number 8 as C1 and D as C2 while base 309 includes number 9 as C1 and B as C2. In this embodiment, the object of the multi-characteristic matching game is to match one characteristic C1 or C2 of one selection to one characteristic C1 or C2 of either base, or both. It should be appreciated that the player may receive additional credits or points, or a multiplier if the player is able to match a characteristic of a selection to a characteristic of both bases.

Providing two bases enhances the player's chances of making a match assuming the same number of 36 combinations. During the first play of the game, the player is able to match C1 of selection 312 to C1 of base 308 as illustrated in FIG. 7A. However, during the next play, the player is not able to match any of the characteristics of base 308. However, the player is able to match C2 of selection 318 to C2 of base 309 as illustrated in FIG. 7B. The matching game continues until the player is unable to match any of the characteristics as illustrated in FIG. 7C. It should be appreciated that the award could be modified because two bases are used. That is, the gaming device 10 may only provide an award for the base having the most matches or based on the last base matched. Furthermore, the gaming device 10 could reduce the award by the number of selections that remain unmatched. The other alternative award embodiment, may also be employed with this multiple base embodiment.

Figure 8B:
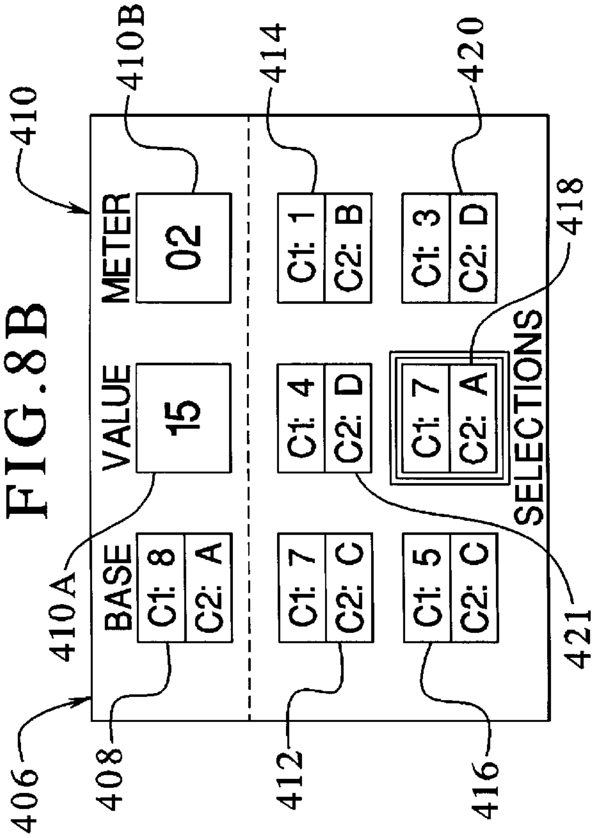
FIGS. 8A and 8B are front elevational views of a display of yet another alternative embodiment of the multi-characteristic matching game of the present invention illustrating a base having two characteristics and choosing selections from the plurality of selections having at least one characteristic that matches a characteristic of the base from the plurality of selections.
Figure 8A:
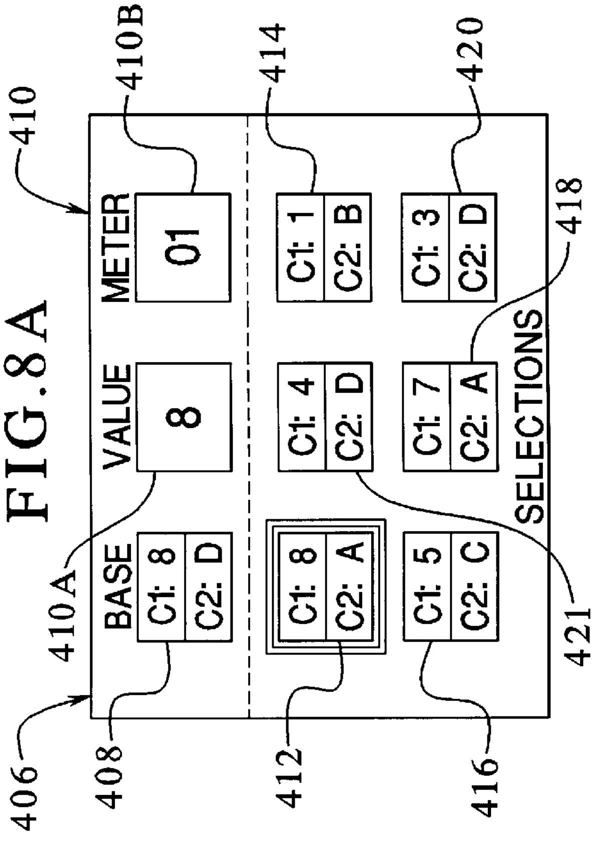

Referring now to the embodiment of the multi-characteristic matching game illustrated in FIGS. 8A and 8B, the gaming device 10 provides a screen or display 406. The display provides at least one base 408, award display 410 including value display 410A and match display 410B, and a plurality of selections 412, 414, 416, 418, 420 and 421 similar to that discussed above in FIGS. 6A through 6F. It should be appreciated that here the game does not award predetermined values. Rather, the game provides an award equal to the value of each selection. For example, in FIG. 8A the player selects selection 412. The gaming device awards the player a value of 8 equal to C1 of selection 418 which is illustrated in the value display 410A. The player then selects section 418 of FIG. 8B. The gaming device awards the player a value of 7 which is added to the value display 410A as illustrated in FIG. 8B.

Figure 9A:
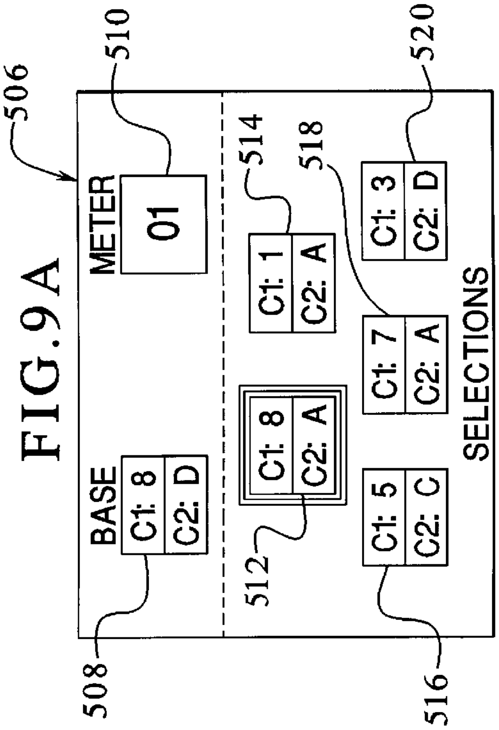
FIGS. 9A, 9B and 9C are front elevational views of a display of yet another alternative embodiment of the multi-characteristic matching game of the present invention illustrating a base having two characteristics and choosing selections having at least one characteristic that matches a characteristic of the base from a decreasing number of selections.
Figure 9B:
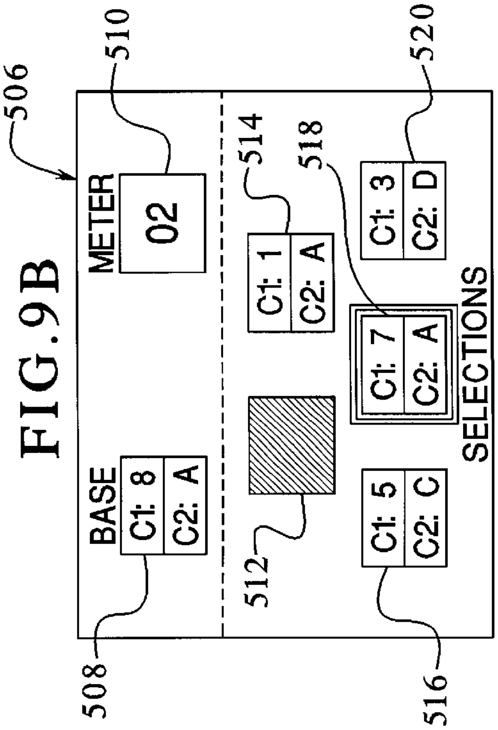
Figure 9C:
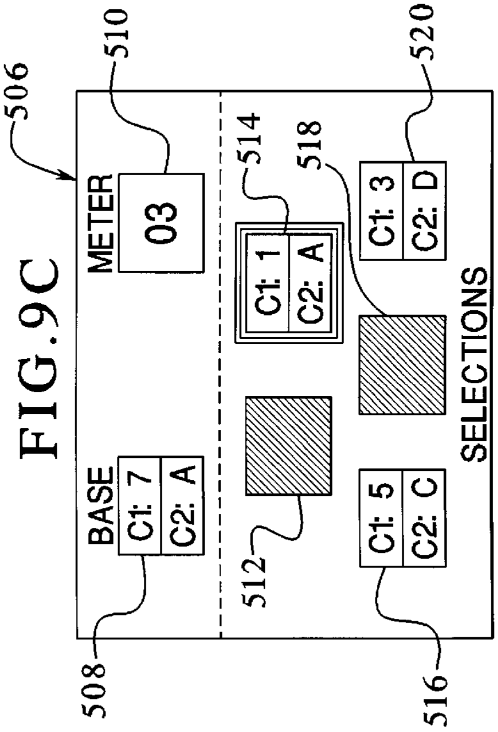

Referring now to the alternative embodiment of the multi-characteristic matching game illustrated in FIGS. 9A, 9B and 9C, the gaming device 10 provides a display 506. In the illustrated embodiment, the display provides at least one base 508, a match display 510 and a plurality of selections 512, 514, 516, 518 and 520.

During the first play of the bonus game illustrated in FIG. 9A, the base displays C1=8 and C2=D. The player looks for a match. In this illustrated embodiment, selection 512 has a characteristic C1=8 that matches C1 of the base. The player picks selection 512. The gaming device 10 highlights selection 512. The gaming device 10 also records this match in the award display, incrementing the number of matches by one, so that the award display reads "01."

The gaming device 10 provides a new or subsequent base as illustrated in FIG. 9B. In this embodiment, the gaming device 10 does not generate a new selection 512. Rather, the game may mask or remove each selection once it is selected, as illustrated in FIGS. 9B and 9C. If the game masks the selection, the player does not know whether a match will occur if the player chooses that selection (i.e., because it is masked.) If the game removes the selection, this reduces player's chance of making a match during each subsequent play of the game.

Figure 10:
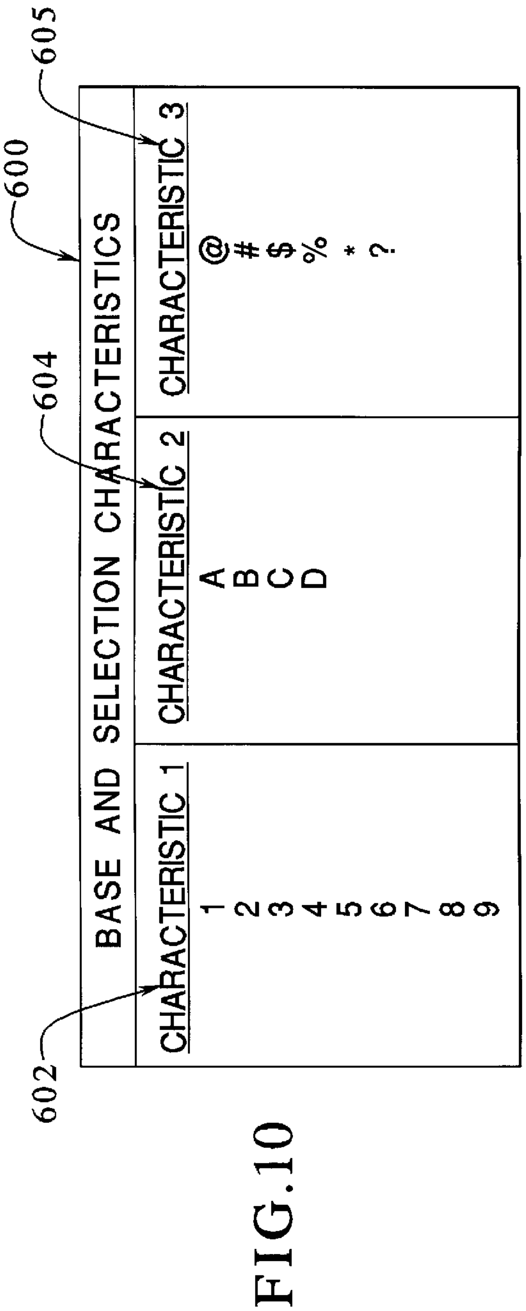
FIG. 10 is a table illustrating three characteristics used in an alternative embodiment of the multi-characteristic matching game of the present invention.

Referring now to FIG. 10, table 600 illustrates three sets of characteristics similar to the two characteristics provided by table 100 of FIG. 3. The characteristic sets include: (a) the number set consisting of numbers 1 through 9 (Characteristic 1 generally designated 602); (b) the letter set consisting of letters A through D (Characteristic 2 generally designated 604); and (c) the symbol set consisting of symbols @, #, $, %, +and ? (Characteristic 3 generally designated 605). In this embodiment, the gaming device can form 216 possible combinations of the Characteristics 1, 2 and 3.

Figure 11:
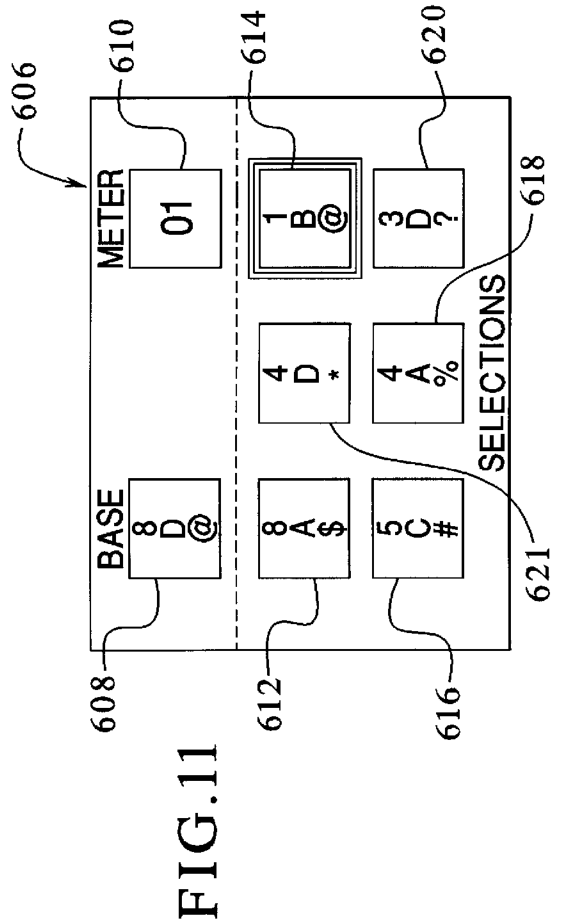
FIG. 11 is a front elevational view of a display of one embodiment of the multi-characteristic matching game of FIG. 10 illustrating a base having three characteristics and choosing a selection from a plurality of selections, wherein the selection has at least one characteristic that matches a characteristic of the base.

A game using three characteristics is generally illustrated in FIG. 11. The gaming device 10 provides at least one value from each of the characteristic sets to the base and to each of the selections as discussed previously. The gaming device 10 provides a display 606. In the illustrated embodiment, the display provides base 608, match display 610 and a plurality of selections 612, 614, 616, 618, 620 and 621, each of which have three characteristics.

During the first play of the bonus game illustrated in FIG. 11, the base displays C1=8, C2=D and C3=@. The player looks for a selection displaying a matching characteristic C1, C2 or C3. In this illustrated embodiment, selection 614 has a characteristic C3=@ that matches C3 of the base. The player selects selection 614. The matching game continues, providing new bases and selections until the matching game ends or is terminated.

Both the base and the selections may have three or more characteristics. However, in a further alternative embodiment, the base may at any one time, have or display one or two out of the three possible characteristics of the base game. The controller can choose which characteristics to display for the base. In this embodiment, the selections may display all three possible characteristics. After a selection is matched to a base, a characteristic can be removed from the selection when it replaces the base.

Conversely, in another embodiment of the present invention, the base can display all three characteristics while the selections display only two out of the possible three characteristics of the selections. After a selection is matched to the base, a characteristic can be added to that selection for subsequent matches.

Alternative embodiments can include four or more sets of characteristics. As in the embodiments mentioned above, the controller can choose the number of characteristics to display for the base and selections. In addition, the controller can choose which sets of characteristics to display.

Figure 12:
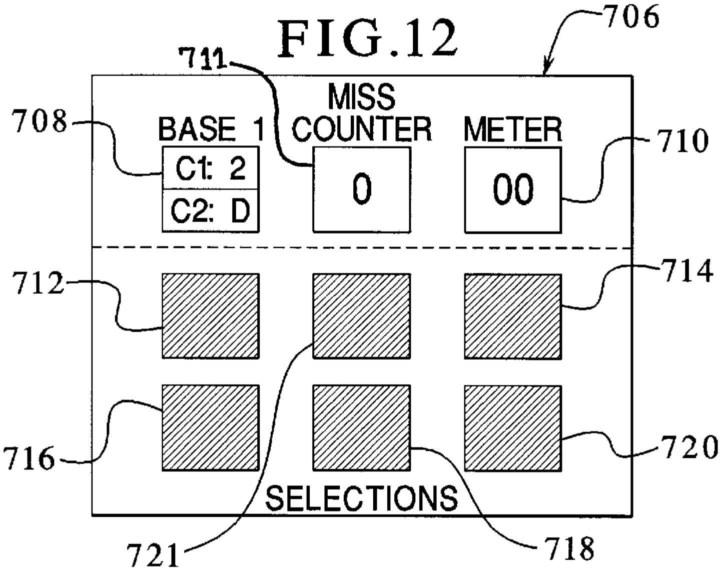
FIG. 12 is a front elevational view of a display of one embodiment of the multi-characteristic matching game illustrating a base and a plurality of masked selections.

Referring now to FIG. 12, an alternative embodiment of the multi-characteristic game of the present invention includes a display 706 having a base 708, a match meter 710 and a plurality of selections 712, 714, 716, 718, 720 and 721. In this embodiment, all of the selections are masked so that the player does not know if the selection the player picks will have a characteristic matching the base. In this embodiment, any number of selections may be masked or revealed to the player as desired by the implementor of the game. In this embodiment, preferably, a miss counter 711 is employed to allow the player a certain number of misses or selections which do not match the base. The player selects the selections and obtains a match if one of the characteristics of the player's selection matches one of the characteristics of the base. If one of the characteristics of the picked selection does not match any characteristic of the base, then a miss is added to the miss counter 711. The game includes a pre-determined miss limit. The game ends if the number of misses the player obtains equals or exceeds the miss limit. The player's award, if any, is based on the number of matches obtained before reaching the miss limit.

In an alternative embodiment of the method of FIG. 12, the selections revealed that do not match the characteristics of the base and add a miss to the miss counter remain revealed and are eligible to be used later in the game. Once the base changes, it is possible that the new characteristics of the new base match one or more of the characteristics of the miss selection. The miss selection may be used to match the base and add to the match meter.

Figure 13A:
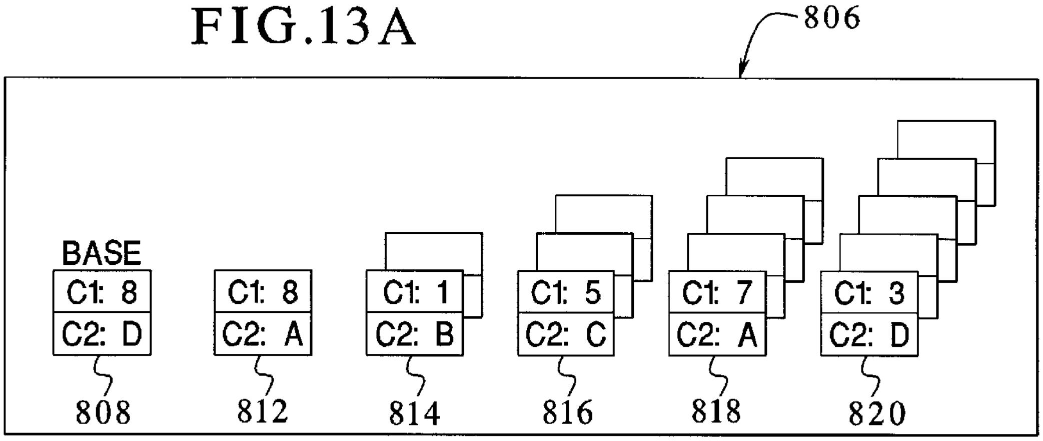
FIG. 13A is a front elevational view of a display of one embodiment of the multi-characteristic matching game illustrating a base and a plurality of sets of selections wherein one of the selections in each set is revealed and the other selections in each set are masked.
Figure 13B:
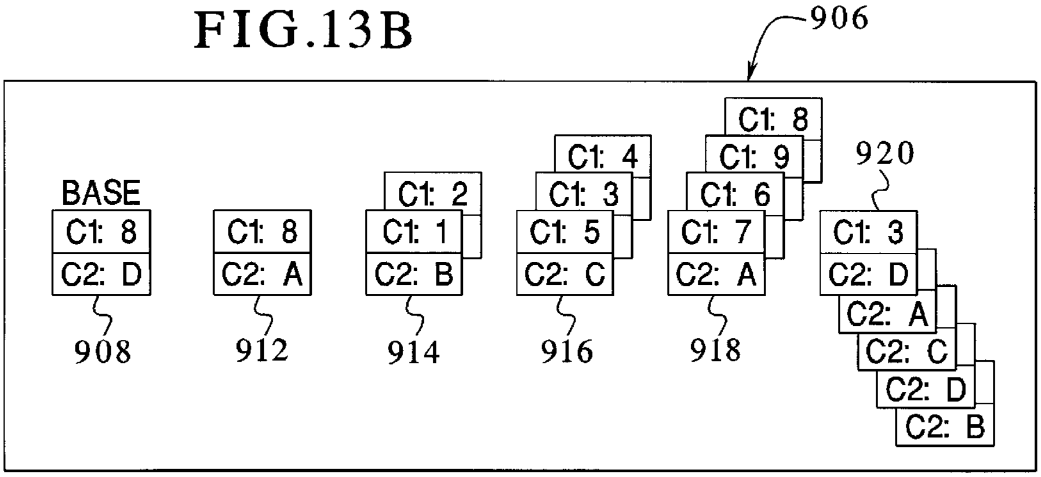
FIG. 13B is a front elevational view of a display of one embodiment of the multi-characteristic matching game illustrating a base and a plurality of sets of selections wherein one of the selections in each set is not revealed and the rest of the selections in each set are partially revealed and partially masked.
Figure 13C:
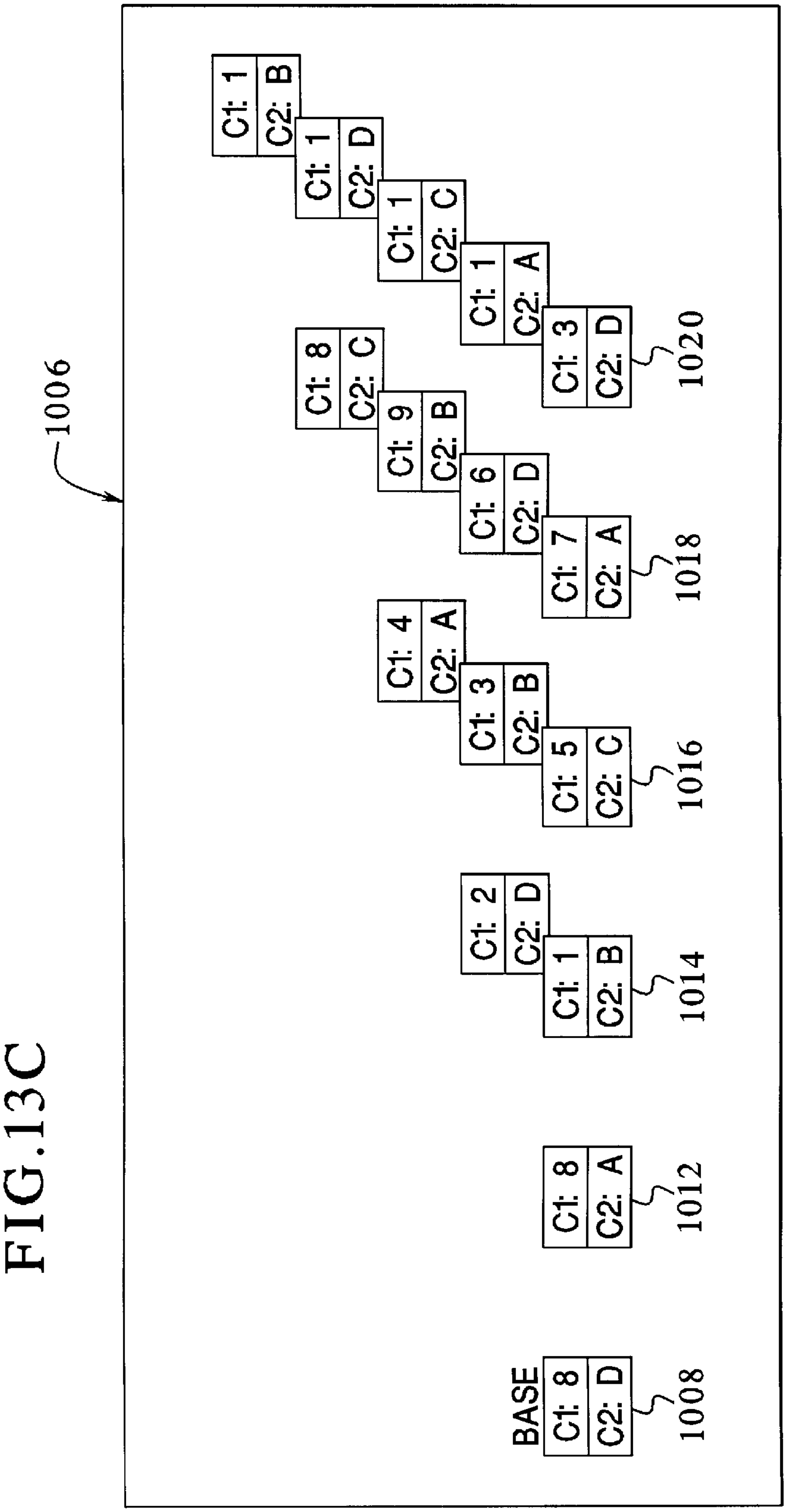
FIG. 13C is a front elevational view of a display of one embodiment of the multi-characteristic matching game illustrating a base and a plurality of sets of selections wherein each selection in each set is revealed to the player.

Referring now to FIGS. 13A, 13B and 13C, further alternative embodiments of the present invention provide display devices 806, 906 and 1006, respectively. Each display device has a base 808, 908 and 1008, respectively. Each display also includes a plurality of sets of selections 812, 814, 816, 818 and 820, 912, 914, 916, 918 and 920, and 1012, 1014, 1016, 1018 and 1020.

In the display 806, the characteristics of only one selection in each set of selection is revealed to the player. The other selections in each set are masked from the player. When one of the selections in one of the sets has been selected, the next selection in that set is revealed to the player. Alternatively, the next selection in the set is not revealed to the player.

In the display 906, the characteristics of one selection in each set are revealed to the player, in addition to the characteristics of each of the other selections in each set. This provides the player with additional information for each new set which the player can use to make the selections.

In the display 1006, each selection in each set is fully revealed to the player which allows the player to select a strategy for maximizing the number of matches. It should be appreciated that the number of selections in any set may vary. It should also be appreciated that combinations of the revealed or masked selections in display 806, 906 and 1006 may be mixed. In particular, certain selections in a set may be revealed, masked, partially revealed or fully revealed.

In further alternative embodiments of the present invention, the amount wagered affects the play of the gaming device. In one embodiment, the credits wagered determine the number of selections provided to a player. For example, a user wagering one credit may receive one selection at the start of play, and a user wagering three coins may receive three selections at the start of play. It should be appreciated that the number of selections provided at the start of game play is not necessarily based on a one-to-one ratio. In another embodiment, the number of bases varies based on the player's wager. It should be appreciated that there is preferably a maximum wager for each game and an associated maximum number of selections or bases.

In another embodiment, the number of selections provided to a user may change during the course of game play based on the credits wagered during the course of play. For example, a user may begin a game with three selections. Upon choosing one or more selections, the user may be left with fewer selections than which the user started with. A user may then bet additional credits during the course of play to receive additional selections. In the example given, if the user has only two selections remaining to choose from, the user may bet an additional credit and receive one or more additional selections or bases.

In a further embodiment of the present invention where the selections are masked or partially masked, the amount wagered at the beginning of game determines the player's number of misses or miss limit. For example, wagering one credit may allow the user only one miss. However, if a user wagers three credits, the user may be entitled to three misses. Again, the number of misses allowed to a user based on the amount wagered may not necessarily be a one-to-one ratio. Similarly, the amount of misses may change based on the number of credits wagered during game play. For example, a user who has three misses and is allowed five misses may bet an additional credit and have the miss limit extended to seven misses.

In a further embodiment of the present invention, the number of credits wagered may determine the number of possible characteristics allocated to a base or a selection. For example, a user wagering one credit may receive a base and selections having only two characteristics. However, a user wagering five credits may receive a base and selections having five characteristics. Again, in an alternative embodiment, the number of characteristics could be changed during game play. For example, wagering an additional credit during game play may provide a user with an additional characteristic.

Further, in another embodiment of the present invention, the amount wagered may determine the probability of matching a base and selections. For example, wagering only one credit may provide a user with less of a probability of matching selections to a base than wagering three credits. The controller can decide how to increase the probability, i.e., increasing the number of selections, characteristics, etc. The probability of matching a selection to abuse can also be changed during game play or desired by the implementor of the game.

In another alternative embodiment, an algorithm could be implemented wherein the determination of the characteristic of the selections are based upon the characteristics of the base and/or previously revealed selections. For example, a set may determine the second characteristic for the base with equal probability. That is, twenty-five percent probability for each of the characteristics A, B, C and D. If characteristic A is assigned, the game may make it more likely that characteristic A is assigned to the selections. One example would be a forty percent probability of selecting A and a twenty percent probability of selecting each of the remaining characteristics B, C and D. The game could alternatively perform the opposite and make it less likely to assign the matching characteristic to the selections.

It should be appreciated that the alternative embodiments of the multi-characteristic matching game of the present invention can be simultaneously implemented in a single primary game or bonus round or each implemented individually in different primary games or bonus rounds. The determination of when to implement such alternative embodiments could also be randomly determined.

It should further be appreciated that the present invention may alternatively be implemented as a casino table game. In such embodiment, after the player makes an initial wager, the base and the selection may be revealed or partially revealed to the player as described above. Additional wagers may also be placed to obtain different or additional bases and/or selections.

While the present invention is described in connection with what is presently considered to be the most practical and preferred embodiments, it should be appreciated that the invention is not limited to the disclosed embodiments, and is intended to cover various modifications and equivalent arrangements included within the spirit and scope of the claims. Modifications and variations in the present invention may be made without departing from the novel aspects of the invention as defined in the claims, and this application is limited only by the scope of the claims.

The invention is hereby claimed as follows:

1. A gaming device having a gaming scheme comprising:

a controller;

at least one base having at least two characteristics;

a plurality of initial selections, each selection having at least two characteristics;

means connected to the controller for selecting one selection having at least one characteristic matching at least one characteristic of the base; and means connected to the controller for providing an award.

2. The gaming device of claim 1, wherein the base is selected from the plurality of initial selections.

3. The gaming device of claim 1, which includes a display adapted to communicate with the controller and adapted to display the base and the selections.

4. The gaming device of claim 1, which includes means adapted to communicate with the controller for determining the characteristics for the base and the selections.

5. The gaming device of claim 4, wherein each characteristic of the base and selections are chosen from a set of characteristics, and the number of characteristics in each set of characteristics is equal.

6. The gaming device of claim 4, wherein each characteristic of the base and selections are chosen from a set of characteristics, and the number of characteristics in each set of characteristics is unequal.

7. The gaming device of claim 4, wherein the controller is adapted to determine at least one characteristic for the base and is adapted to determine at least one characteristic for a selection.

8. The gaming device of claim 4, wherein the characteristics for the base and the selections are predetermined.

9. The gaming device of claim 1, wherein each characteristic is selected from a group consisting of numbers, letters, colors, symbols, characters, pictures and images.

10. The gaming device of claim 1, which includes means connected to the controller for replacing the base after each selection is selected.

11. The gaming device of claim 1, which includes means connected to the controller for providing a new selection after each selection is selected.

12. The gaming device of claim 1, which includes means connected to the controller for removing one of the selected selections.

13. The gaming device of claim 1, which includes means connected to the controller for replacing the base with one of the selected selections.

14. The gaming device of claim 1, wherein at least one of the selections is masked.

15. The gaming device of claim 1, wherein a plurality of the selections are masked.

16. The gaming device of claim 1, wherein all the selections are masked.

17. The gaming device of claim 16, which includes a miss counter and wherein if a selected selection does not have a matching characteristic to the base, the controller records a miss in the miss counter.

18. The gaming device of claim 17, which includes a miss limit, whereby the game terminates when the miss counter meets or exceeds the miss limit.

19. The gaming device of claim 1, which includes an accept button enabling a user to terminate a game after selecting one of the selections.

20. The gaming device of claim 1, which includes a reject button enabling a user to continue a game after selecting one of the selections.

21. The gaming device of claim 1, which includes a functional element associated with at least one selection.

22. The gaming device of claim 21, wherein the functional element is a wild characteristic which may be matched with any characteristic.

23. The gaming device of claim 22, wherein the base includes a wild characteristic.

24. The gaming device of claim 1, wherein said plurality of selections are grouped in a plurality of sets of selections.

25. The gaming device of claim 24, which includes means for revealing at least one selection from each set of selections.

26. The gaming device of claim 24, which includes means for revealing the characteristics of one selection from each set and at least one characteristic of at least one selection from one of the sets.

27. The gaming device of claim 24, which includes means for revealing the characteristics of one selection from each set and at least two characteristics of at least one selection from one of the sets.

28. The gaming device of claim 1, wherein at least one characteristic associated with one of the selections is a multi-part characteristic.

29. The gaming device of claim 1, wherein the award is based on a number of matches.

30. The gaming device of claim 29, which includes a match display connected to the controller.

31. The gaming device of claim 1, wherein the award is based on a value assigned to a characteristic.

32. The gaming device of claim 31, which includes a value display connected to the controller.

33. The gaming device of claim 1, wherein the award is based on a predetermined value.

34. The gaming device of claim 1, wherein the award is based on a last selection.

35. The gaming device of claim 34, wherein the award is based on a value associated with at least one characteristic of the last selection.

36. The gaming device of claim 34, wherein the award is based on a predetermined value associated with the last selection.

37. The gaming device of claim 1, wherein the award is based on the number of selections which are unmatched.

38. The gaming device of claim 1, wherein the award is based on the number of matches as modified by a modifying factor.

39. The gaming device of claim 38, wherein the modifying factor is a multiplying factor.

40. The gaming device of claim 38, wherein the modifying factor is a value associated with a last selection.

41. The gaming device of claim 38, wherein the modifying factor is based on the number of matching selections.

42. The gaming device of claim 38, wherein the modifying factor is based on a value assigned to each characteristic.

43. The gaming device of claim 1, wherein the award is based on a value as modified by the number of matches.

44. The gaming device of claim 1, which includes a plurality of bases, each base having at least two characteristics.

45. The gaming device of claim 44, wherein the award is based on the number of matches for one of said plurality of bases.

46. The gaming device of claim 45, wherein the award is based on the base which has the greater number of matches.

47. The gaming device of claim 45, wherein the award is reduced based on the number of selections that are unmatched.

48. The gaming device of claim 1, which includes the base having more than two characteristics.

49. The gaming device of claim 48, which includes at least one of the selections having more than two characteristics.

50. The gaming device of claim 1, wherein a number of sets of characteristics for the base and at least one of the selections are equal.

51. The gaming device of claim 1, wherein a number of sets of characteristics for the base and selections are unequal.

52. The gaming device of claim 51, wherein the number of sets of characteristics of the base is greater than the number of sets of characteristics for the selections.

53. The gaming device of claim 51, wherein the number of sets of characteristics of the selections is greater than the number of sets of characteristics for the base.

54. The gaming device of claim 1, wherein the number of selections provided to a player depends on an amount wagered by said player.

55. The gaming device of claim 1, wherein the number of selections provided is dependent on the amount wagered during game play.

56. The gaming device of claim 1, which includes a miss limit dependent on an amount wagered by a player.

57. The gaming device of claim 56, wherein the miss limit is dependent on additional wagering during game play.

58. The gaming device of claim 1, wherein the number of characteristics allocated to the base and the selection is dependent on an amount wagered by a player.

59. The gaming device of claim 58, wherein the number of characteristics allocated to the base and the selections during game play is dependent on the amount wagered by the player.

60. The gaming device of claim 1, wherein the probability of matching a selection to the base determined by an amount wagered by a player.

61. The gaming device of claim 60, wherein the probability of matching one of the selections to the base during game play is dependent on the amount wagered by the player.

62. A gaming device comprising:

a display device;

a processor adapted to communicate with said display device, said display device and said processor adapted to (a) display at least one base having at least two characteristics, (b) display at least two selections, each selection having at least two characteristics, (c) enable a player to match one of the characteristics of one of the selections to one of the characteristics of the base until the player is unable to match characteristics of selections to the base, (d) determine an award; and means adapted to communicate with said processor for accepting a wager from a player.

63. The gaming device of claim 62, whereby said processor is adapted to base the award based on the number of matched selections.

64. The gaming device of claim 62, whereby said processor is adapted to base the award on the number of unmatched selections.

65. The gaming device of claim 62, whereby said display and said processor are adapted to enable the player to terminate the matching game after matching one of the characteristics of one of the selections to one of the characteristics of the base.

66. The gaming device of claim 62, wherein said display device and said processor are adapted to provide a different number of characteristics for the base and the selections.

67. The gaming device of claim 66, wherein said processor is adapted to determine the award on the values assigned to characteristics.

68. The gaming device of claim 62, wherein said display device and said processor are adapted to allocate an equal number of characteristics to the base and the selections.

69. The gaming device of claim 62, wherein said processor is adapted to assign values to characteristics.

70. A gaming device having a gaming scheme comprising:

a controller;

a base having two characteristics;

a plurality of selections, each selection having two characteristics;

an award display;

a display connected to the controller adapted to display the base, the selection and the award display; and means connected to the controller for matching one characteristic of the base and one characteristic of at least one selection.

71. A method of operating a matching game for a gaming device, said method comprising the steps of:

(a) providing a base having at least two characteristics;

(b) providing at least two selections, each selection having at least two characteristics;

(c) enabling a player to pick at least one selection having at least one characteristic matching one of the characteristic of the base; and (d) repeating steps (a) through (c) until the player is unable to pick a selection having one characteristic matching one of the characteristics of the base.

72. The method of claim 71, which includes providing an award based on a number of matches.

* * * * *

UNITED STATES PATENT AND TRADEMARK OFFICE

CERTIFICATE OF CORRECTION

PATENT NO. : 6,749,502 B2

DATED : June 15, 2004

INVENTOR(S) : Anthony J. Baerlocher

It is certified that error appears in the above-identified patent and that said Letters Patent is hereby corrected as shown below:

<u>Column 6,</u>
Line 23, change “4G” to -- 4C --.

<u>Column 9,</u>
Line 16, change “players has matched” to -- players have matched --.

<u>Column 10,</u>
Line 13, change “modifying 5 factor” to -- modifying factor --.

Signed and Sealed this

Twelfth Day of April, 2005

JON W. DUDAS

*Director of the United States Patent and Trademark Office*